United States Patent [19]
Sellari, Jr.

[11] 3,845,249
[45] Oct. 29, 1974

[54] MULTI-FREQUENCY RECEIVER

[75] Inventor: Daniele Sellari, Jr.; Henry A. Richard, both of Corinth, Miss.

[73] Assignee: International Telephone and Telegraph Corporation, New York, N.Y.

[22] Filed: Mar. 9, 1973

[21] Appl. No.: 339,562

[52] U.S. Cl. .......... 179/84 VF
[51] Int. Cl. .......... H04m 1/50, H04q 9/12
[58] Field of Search.... 179/84 VF, 18 AD, 99, 84 R

[56] References Cited

UNITED STATES PATENTS

| | | | |
|---|---|---|---|
| 3,128,349 | 4/1964 | Boesch et al. | 179/84 VF |
| 3,140,357 | 7/1964 | Bischof et al. | 179/84 VF |
| 3,288,940 | 11/1966 | Bennett et al. | 179/84 VF |
| 3,582,565 | 6/1971 | Beeman | 179/84 VF |
| 3,686,440 | 8/1972 | Kroeger | 179/5.5 |
| 3,710,031 | 1/1973 | Sellari | 179/84 VF |

*Primary Examiner*—Kathleen H. Claffy
*Assistant Examiner*—Joseph A. Popek
*Attorney, Agent, or Firm*—James B. Raden; Marvin M. Chaban

[57] ABSTRACT

Multi-frequency receivers or voice frequency are employed in telecommunication systems to validate and receive digital signals from stations having multi-frequency control signalling facilities, and to receive digital information from similarly equipped data transmitting stations. Each receiver provides a number of validating tests which it performs on the received signals prior to passing the signals to translators and decoders. The signals most frequently used in telephone practice in the United States comprise the standard eight tone, two group signals which are checked as to frequency, duration, the presence of one tone per group, minimum amplitude level and signal amplitude. In the validation process employed by the disclosed receiver, the voltages of each group output are summed, the summation voltage being necessary to trigger an output. Also, the input signals must be terminated before output signals will be generated.

6 Claims, 4 Drawing Figures

PATENTED OCT 29 1974 3,845,249

SHEET 1 OF 3

FIG. 2
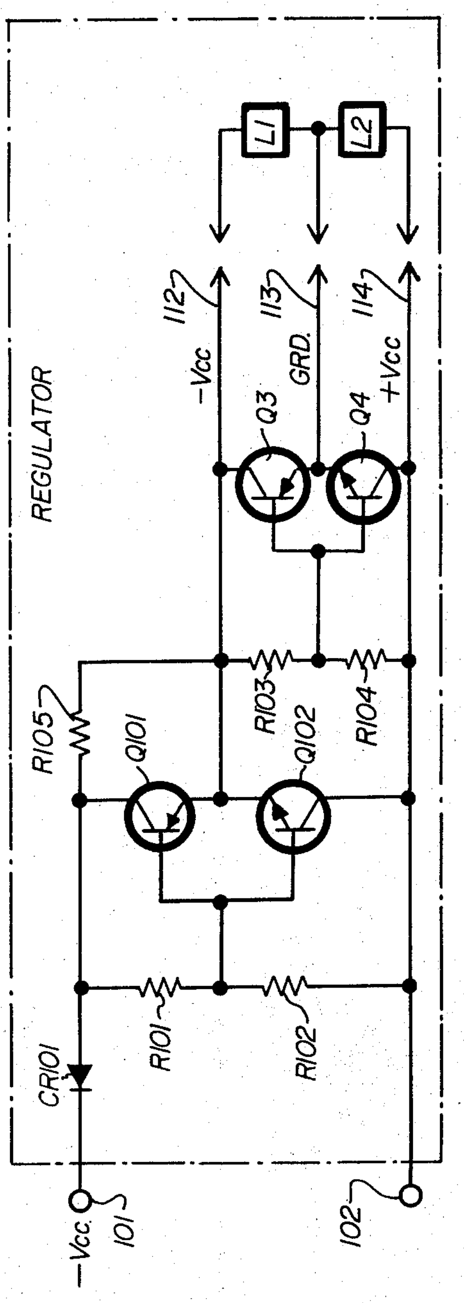
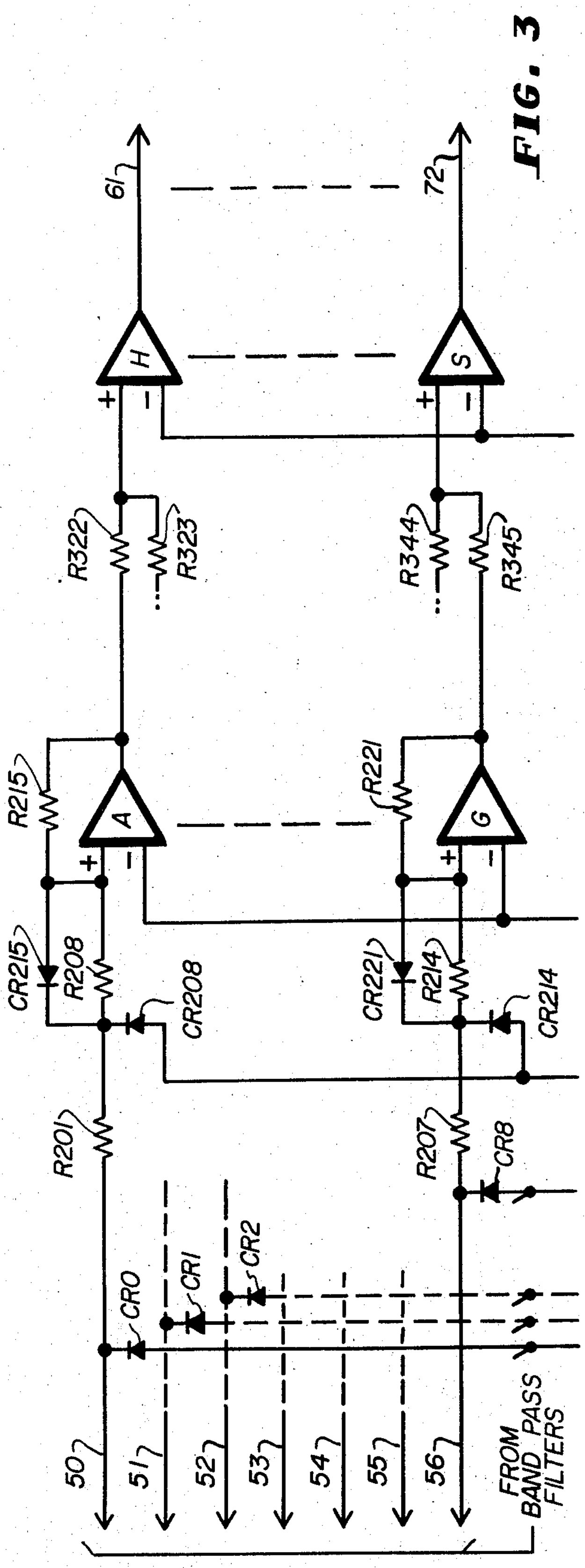

MULTI-FREQUENCY RECEIVER

BACKGROUND OF THE INVENTION

Historically, at the inception of multi-frequency pushbutton actuated signalling, relays and electromechanical components were used wherever feasible as the most dependable components then available. Since that time there have been many attempts to produce solid state receivers providing the necessary degree of reliability and sensitivity. For example, one system setting out the basic parameters required of an acceptable receiver is shown by U.S. Pat. No. 3,076,059 issued to L. A. Meacham et al. on Jan. 29, 1963 for Signalling System.

A further paper of L. Gasser and E. Ganitta entitled "Speech Innumity of Push-Button Tone Signalling Systems Employing Tone Receivers with Guard Circuits" published in Electrical Communication in Volume 39, No. 2, 1964 on pages 220 et seq. sets forth generally the early background of the art on which the present invention is based.

In the telecommunications industry, both telephone and data transmission use multi-frequency tones in the voice frequency range as the signalling medium. The tones must be separated, evaulated and channeled through a series of filtering networks. In PBX usage for storing such information, buffer storage, most usually electromechanical in nature, has been employed.

A network using active filters is shown in U.S. Pat. No. 3,710,031 issued Jan. 9, 1973 to one of the co-inventors hereof, D. Sellari. This patent application shows an earlier version of a network used to receive pushbutton dial originated signals, and to validate, decode and store these signals for further use.

SUMMARY OF THE INVENTION

The present invention relates to and has as its major object to provide a new and improved multi-frequency receiver for telephone pushbutton signalling.

It is a further object of the invention to provide an improved system for validating multi-frequency, voice band code signals for processing through a telephone exchange.

It is a still further object of the invention to provide a voice frequency receiver capable of employing of integrated circuits, primarily operational amplifiers.

It is another object of the invention to provide a multi-frequency code validating system using solid state techniques to test in an improved fashion the presence of two signals one in each frequency group and to test for the duration and strength of the signals.

It is a still further object of the invention to provide a multi-frequency receiver circuit which requires that the input signal be terminated before an output signal is generated.

The present invention provides a multi-frequency receiver using circuits capable of employing integrated circuits, such as operation amplifiers. In this way, the entire receiver is capable of being mounted in a very compact space requiring little power. Further, interchangeable modules may be used requiring merely replacement of a defective module in cases of trouble, or replacement of all modules, if necessary.

These and other features, objects and advantages of the invention will become apparent from the accompanying drawings when viewed with the following description.

BRIEF DESCRIPTION OF THE DRAWINGS

FIG. 2 is a schematic circuit diagram of a regulator circuit used in system of FIG. 1; and FIGS. 3 and 4 combinedly form a schematic diagram in greater detail of the signal detector arrangement using our invention, with FIG. 4 being placed beneath FIG. 3 with the long side of each adjoining.

DETAILED DESCRIPTION OF THE DRAWINGS

Figure 1:
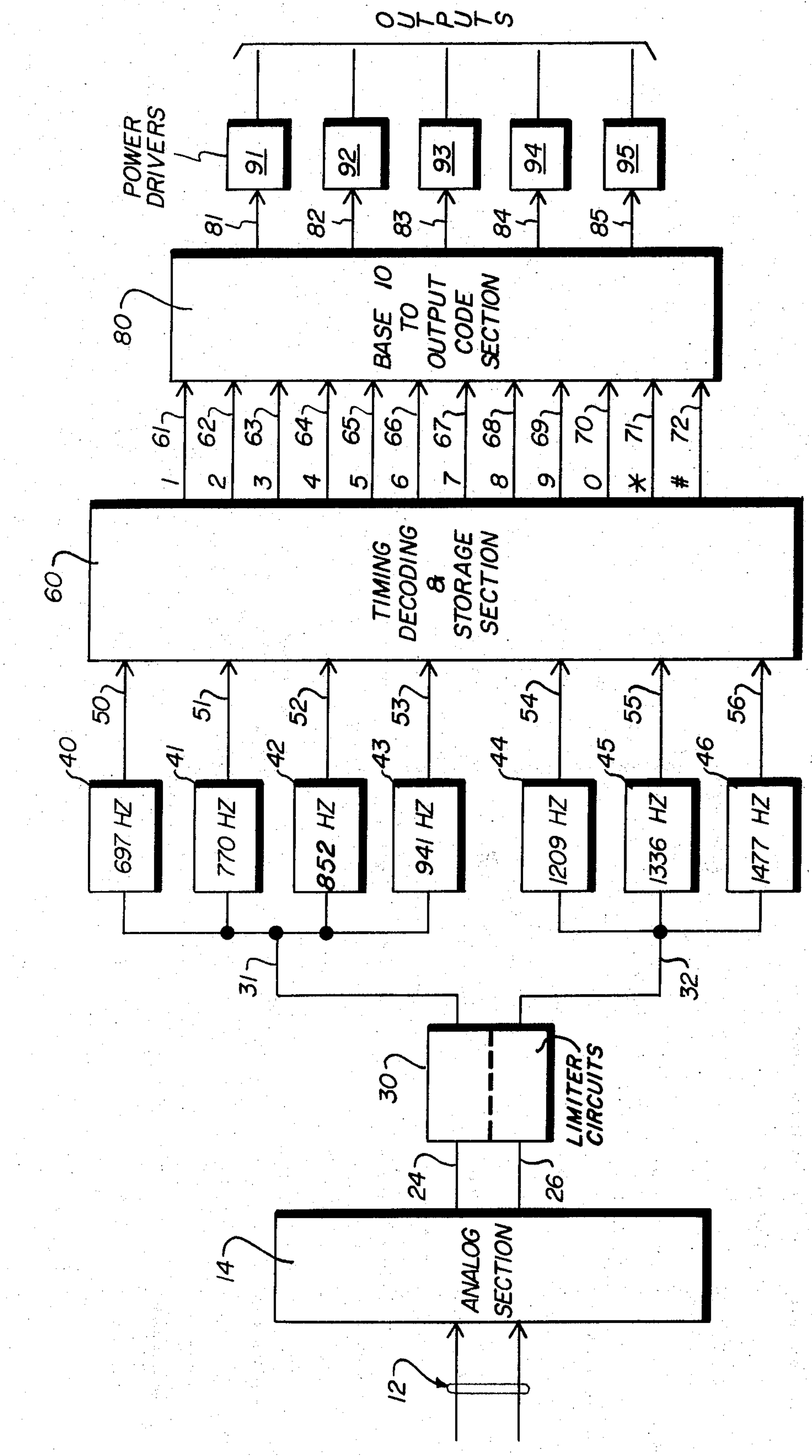
FIG. 1 is a block schematic circuit diagram of receiver network employing our invention.

In FIG. 1, we show a system for receiving and validating tone signals generated at a station instrument and transmitted to the tone receiver and digit register forming the subject of this invention. The input path 12 to the system may be derived from the common control (not shown), from a telephone line circuit or other suitable path, the signals received thereover having been originated at a telephone subscriber station or data transmission terminal instrument (not shown) having multi-frequency signal generation capability.

As is well-known in the art, suitable oscillators respond to the depression of pushbuttons at a telephone instrument or data terminal to produce multi-frequency tones within the voice frequency band corresponding to the respective pushbutton or buttons depressed. The tone signals resulting from the button depression are transmitted over the line in the sequence generated. The tone signals must be distinguished from any other tones or voice signals transmitted to the line validated and translated into suitable binary code signals for transmission of the digital signal information to suitable memory equipment, switching systems or the like.

The frequencies employed have been standardized for telephone use. In general use at the present time is the two out of eight code in which signals of two frequencies out of the eight available constitute each digital signal. The frequencies are grouped into a high group and a low group, and a valid digital signal must include one frequency from each group. Each generated frequencies or tone signal must be of proper duration to be differentiated from spurious noise and to be classified as a valid digital signal. Each frequency signal must fall within a predetermined frequency range and be of at least minimum amplitude to be accepted and to constitute part of a valid digital signal. The voltage of the two signal frequncies is summed to produce an output.

The receiver of FIG. 1 is, of course, designed to accept such frequencies, separate true tone signals from one another, check for the presence of simultaneous tone signals, reject spurious tone signals and validate tone signals received. The receiver times, stores, decodes and codes the digits indicated by these signals in the following manner described relative to the drawings as follows:

In FIG. 1, we show a pair of inputs referenced as leads 12 feeding an analog section 14. The analog section serves four basic functions, as follows: (1) Bridges the telephone line with a high impedance across the line; (2) Rejects dial tone and other tones below 680 Hz; (3) Amplifies incoming signals to an amplitude sufficient to allow further processing of the signals; and (4) Separates the incoming frequency signal into respective individual frequencies. Circuits for performing these functions may be seen in the Sellari patent noted.

Signals passed by the respective group pass filters within the analog section on their respective output leads 24 and 26 are fed to the limiter circuits 30. The frequency signals in the respective low and high groups are maintained separately; through the limiter circuits the signals are determined to be of sufficient amplitude to pass the acceptance threshold for shaping into an essentially square waveform. From the limiters 30, high and low signals in essentially square waveform are transmitted to the respective band pass filter of the low group on lead 31, and to the band pass filter of the high group on lead 32.

A multiple path from lead 31 feeds the respective band pass filters of the low group including filter 40 which passes the 697 Hz band, filter 41 which passes the 770 Hz band, filter 42 which passes the 852 Hz band and filter 43 which passes the 941 Hz band.

A multiple path from lead 32 is coupled to the respective band pass filters of the high group i.e., filter 44 for 1209 Hz band, filter 45 for the 1336 Hz band and filter 46 for the 1477 Hz band. Where only ten digits, two symbols, and no other code signals are being used in the system, the eighth filter for 1633 Hz may be omitted (as shown) or its output may be blanked. This frequency (1633 Hz) is used only for adding digital information separate and in addition to the decimal ten digit system employed for telephone signalling and switching.

Each of these band pass filters passes a frequency band within two or two and one half-percent of the basic frequency for that filter, the emitted signal being sinusoidal in form. The individual filters 40–46 pass their respective output frequency bands to the Timing, Decoding and Storage Section over the respective leads 50–57 to section 60. Section 60 serves to validate the received signals for minimum duration, for strength and for group positioning and will decode the signals for storage.

Within section 60, a signal is temporarily stored while the pair of signals is timed for its duration, checked for amplitude and validity. Once the signals are found to be valid they are forwarded to a final stage in which they are stored and decoded into a base ten code output for the base ten code section 80. In code section 80, the base ten output signal is again coded and the output signals are transmitted to power drivers 91–95 for raising the power level of the outputs to levels suitable for use in operating external equipment. This approach is shown generally in the cited Sellari patent, the present invention comprising an improved validity checking circuit within the basic approach of that patent.

In FIG. 2 we show a voltage regulator which has two basic functions, as follows: (1) Produces a doubled ended supply, i.e., +VCC and −VCC from a single ended supply and (2) It produces these voltages at approximately one fourth of the external input supply voltage. With these functions, this regulator eliminates the necessity for a d.c. to d.c. converter.

In FIG. 2 the external supply is applied at terminal 10. This supply is typically that of a telephone Central Office or PBX battery which varies from −44 volts d.c. to −56 volts d.c. External ground is applied at terminal 102. Rectifier CR101 prevents power supply reversal over the external −VCC lead and prevents damage to the regulator.

Resistors R101 and R102 divide the external voltage in half and apply this voltage to the base of transistors Q101 and Q102 in parallel. In this way the emitters of transistors Q101 and Q102 are clamped to approximately −VCC/2. The voltage at the emitters of transistors Q101 and Q102 is divided in half and applied to the base of transistors Q103 and Q104. Hence, the emitters of transistors Q103 and Q104 are clamped to approximately −VCC/4. Since the resistance of load L1 approximates the resistance of resistor R102, and the resistance of loads L1 and L2 equals approximately 200 Ohms, only a small amount of current passes through the transistors. Loads L1 and L2 are integrated circuit operational amplifiers located throughout the receiver. The regulator of FIG. 2 thus provides accurate system bias voltages with respect to ground at terminal 113. The bias voltage produced are a negative voltage (−VCC at terminal 112) and a positive voltage (+VCC at terminal 114). In this way, the requirement for a double ended supply at voltages within the breakdown voltage specifications of operational amplifiers is provided.

In this regulator, only a small amount of current passes through the transistors leaving almost the total supply current passing in series through resistor R105 and load amplifiers RL1 and L2. Therefore the circuit is approximately 50 percent efficient.

In most circuits requiring high efficiency in reducing a large voltage supply to a lower voltage, (i.e., reducing input supply voltage by one-half or more) and then generating a double ended supply from the smaller voltage, a d.c. to d.c. converter is used. Such circuits are expensive and generate voltage transients which are objectionable within the total receiver operation. The present circuit produces a similar output at much lower cost without generating transients.

Figure 4:
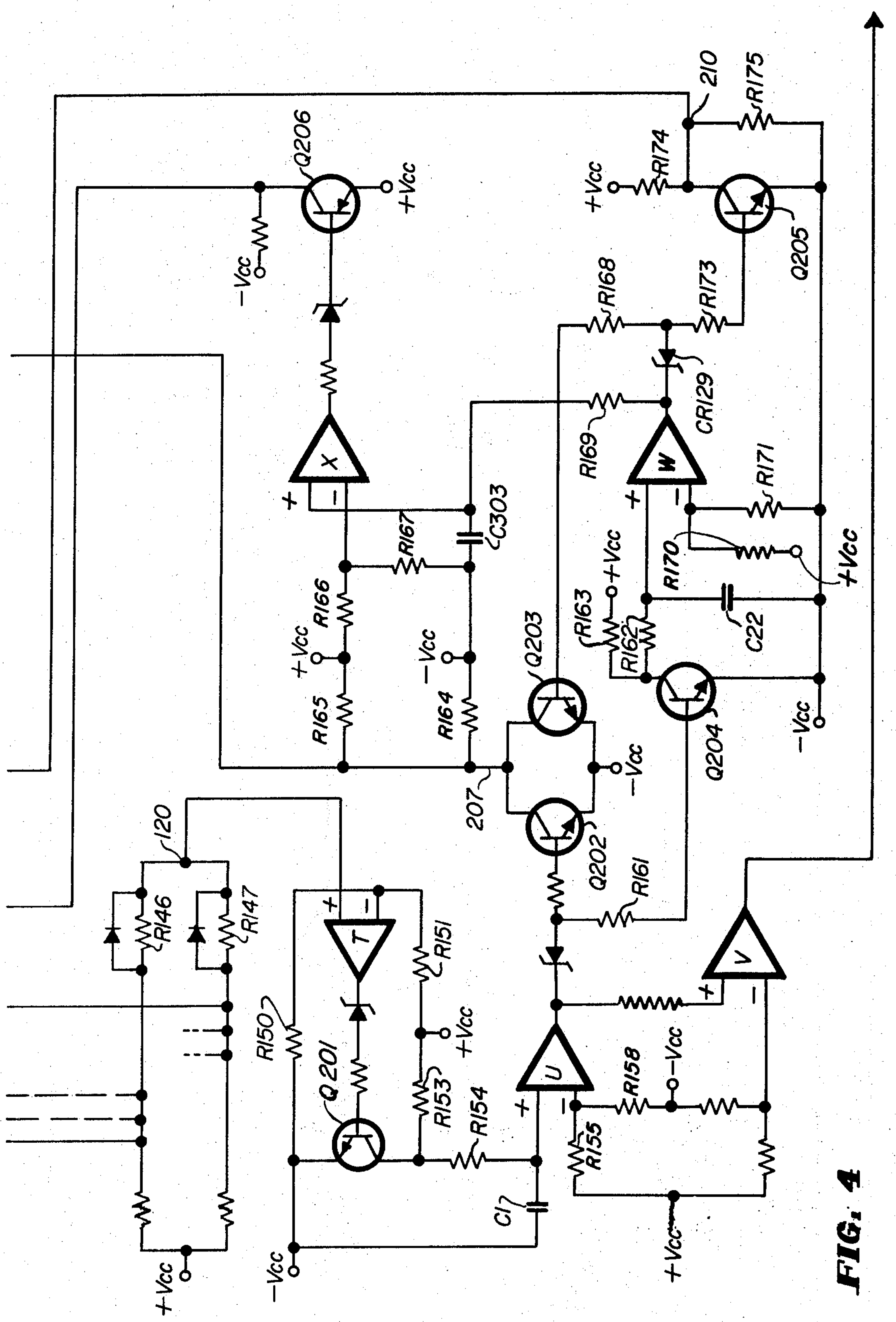

The section 60 used to detect and validate signals is shown in detail in FIGS. 3 and 4 operates as follows: When at least one input of terminals 50–53 goes from a high voltage state (+VCC) to a low voltage state (−VCC); the indicated one of the diodes CR0, CR1, CR2, or CR3 is forward biased and the voltage level at junction point 120 falls from a high voltage level to a lower voltage level. However, this lower voltage level is not below the voltage reference level established by the voltage divider comprised of resistors R150 and R151. Therefore amplifier T retains its high voltage (+VCC) output state.

When at least one input at terminals 54–56 goes from high state (+VCC) to a low state (−VCC), the corresponding diode CR4, CR5, or CR6 is forward biased. The sum of the resulting low voltage states (a first through resistor R146 and a second through resistor R147) drives the voltage at junction 120 below the voltage at the lower input V3 to amplifier T. Amplifier T responds changes from a +VCC state to a −VCC state. Transistor Q201 is shut off by this change of state and +VCC output and charging of capacitor C1, through resistors R153 and R154 begins. Once the level of capacitor C1 has charged to voltage level greater than that as established by the voltage divider R155 and R158; output of amplifier U changes from a low state (−VCC) to a high state (+VCC).

If however before the amplifier U has changed states, and the input in either the high group on leads 54–56 or the low group on leads 50–53 ceases, the output of amplifier T immediately returns to a high state (+VCC). The high state of amplifier T drives transistor Q201 to its on state, causing capacitor C1 to rapidly discharge through resistor R154 and transistor Q201. This action requires the coincidence of at least one signal in each group for a prescribed length of time. In requiring this coincidence of signals, we minimize the possibility of speech signals causing operation of the receiver.

Once the output amplifier U goes high, this high voltage signal is passed to amplifier V whose output goes from +VCC state to a −VCC state and remains there as long as the two signal conditions persist. This output indicates to designated signal control apparatus (not shown) that signals have been received and are in the process of being validated. The high state on the output of amplifier U also drives transistor Q202 to its on state. Transistor Q203 had been on initially and therefore no change occurs at its collector due to transistor Q202 being switched on.

The load on amplifier U is heavy, so that its output also drives transistor Q204 to its on state causing discharge of capacitor C22 almost instantaneously. The loss of charge on capacitor C22 occurs in less than 500 nanoseconds as the voltage across this capacitor falls below the voltage reference established by resistors R170 and R171. As a result the output of amplifier W falls from a high voltage condition (+VCC) to a low (−VCC).

The output path from amplifier W may be traced through diode CR129 and resistor R168 to the base of transistor Q203. Thus when the output of amplifier W has dropped, it causes transistor Q203 to shut off. Prior to this time, transistor Q202 had been on and thus there is still no voltage change at the common COLLECTORS of transistor Q202 and Q203. When the low voltage condition at the output of amplifier W coincides with transistor Q202 being on, the output change at the transistor commoned collector turns transistor Q205 off and the voltage at point 210 becomes the reference voltage level. This voltage level is formed by the resistances of resistors R174 and R175 across the bias source.

At the inputs at terminals 50–56, at least one input in each group has gone low. This low level is passed through resistor R201 for example. Tracing a path through diode CR208, we find transistor Q206 is off and therefore a low voltage of −VCC appears at the anode of diode CR208 which causes diode CR208 to be reverse biased. The input low voltage is summed with the high voltage (+VCC) output at (+) terminal of the amplifier having received a signal such as amplifier A. Recall that, before the signal was validated, transistor Q205 was on and that the low signal (−VCC) was present at the negative terminal of amplifier A. The input voltage low level plus the output voltage of amplifier A is not below the voltage at the negative terminal of amplifier A. Thus the output of amplifier A doesn't change. However after validation of a signal, transistor Q205 is turned off and voltage reference at junction 210 appears at the negative terminal of amplifier A.

The sum of the high output state of amplifier A plus the occurrence of an input state below the reference voltage at junction 210 causes the output of amplifier A to go to its low state. Once in the low state, the input signal need not remain low to retain the output of amplifier A in a low state, thus there is a temporary storage of a signal in amplifier A or correspondingly any other of the amplifiers A–G having received a proper signal during a period when transistor Q205 is on.

Previously, we stated that immediately upon validation, the output of amplifier W went low and thus discharged capacitor C303 through resistor R169. When C303 discharges to a level below the voltage reference established by divider including resistors R166 and R167, the output of amplifier X changes from high state to a low state. The output − VCC state of amplifier X results in transistor Q206 turning on to forward bias diode CR208 and place approximately +VCC at the cathode of diode CR208. Now, no further inputs may pass into the amplifiers A through G.

Eventually, the inputs at terminal 50–56 will cease. Then, the output of amplifier T returns to its high state, transistor Q201 saturates, capacitor C1 discharges, the output of amplifier U returns low (−VCC) and transistor Q202 turns off. Transistor Q203 is already off and thus the voltage at the collectors of transistors Q202 and Q203 goes from the low state (−VCC) to a higher voltage (determined by the resistances of the divider including resistors R164 and R165). Thus, the voltage on lead 207 allows the output of amplifiers H through S to change from +VCC to −VCC if the sum of the voltages from any two of the signal amplifiers A - G at their respective (+) terminals is below the voltage at their (−) terminals. Resistors R322 through R345 form voltage dividers which decode the two out of seven code from amplifiers A–G to a base ten code which allows one and only one of amplifier H–S to change state.

As a result, when the output of amplifier U has returned to a low state, transistor Q204 shuts off and capacitor C22 begins charging. As long as capacitor C22 has not charged to the voltage reference established by divider resistors R170 and R171, the output from one of amplifiers H–S may continue. However once capacitor C22 is charged sufficiently, an output of amplifier W returns to the high state which drives transistor Q203 on and the circuit returns to normal.

In the embodiment shown, the output timer is a voltage sensitive device rather than a pulse activated monostable multivibrator, as used by known prior art systems. The present system is therefore less subject to false operations due to noise transients. The present circuit provides a delayed output. A direct advantage of the delayed output is that no storage buffers (registers) are required for PBX's that access central office exchanges.

Recapitulating, normally transistors Q205 and Q206 are off. Both transistors respond to a signal passing summing amplifier U (indicating the start of the timing period). The operating path from the output of amplifier U may be traced through resistor R161, transistor Q204, resistor R162, and amplifier W. The path splits at the output of amplifier W, the path to transistor Q205 passing through diode CR129 and resistor R173. The path to transistor Q206 may be traced through resistor R169 and amplifier X to transistor Q206. Transistor Q206 on conduction provides −Vcc or (+) bias to the (+) input of amplifiers A–G and transistor Q205 on conduction provides −Vcc or (−) bias to the (−) terminal of amplifiers A–G to properly bias the (−) terminal of the amplifiers A–G. Any of these amplifiers receiving a low signal on its (+) terminal, the signal concurring with the on period of transistors Q205 and Q206 will cause the signal to be temporarily stored in the respective amplifier or amplifiers A–G.

The path from the commoned emitters of transistors Q202 and Q203 acts to enable the (−) terminal of amplifiers H–S on receipt of a completed validation to pass the signals temporarily stored by the amplifiers A–G for decoding and use. Temporary storage of signals during validation and transmission of the signals after completion of the validation is shown generally by the cited Sellari patent.

In the present invention, voltage summing is used to ensure that both a high and a low frequency signal are present. A timed interval of concurrence of both signals ensures that a minimum duration occurs. Thereafter, after the originating signals end, the temporarily stored signals are passed to the final stage of amplifiers H–S for decoding and use.

We claim:

1. A multi-frequency receiver for receiving individual frequency tones comprising; a plurality of band pass filters each selective of a different frequency, said filters being grouped into a first and a second group, means for temporarily storing signals passed by said filters, validating means receptive to signals from said filters to include means for summing the signals received from each group and means responsive to the summed signal exceeding a predetermined threshold level for emitting a timing start signal which causes the temporary storage of the signals passed by said filters in said storage means, timing means responsive to said timing start signal for timing the duration of signals received by said summing means, and output means operative after the termination of said frequency signals to said filters and the receipt of the validity control signal from said timing means for causing the transmission of the temporarily stored signals from the storage means to a decoding device.

2. A receiver as claimed in claim 1, wherein said summing means includes integrated circuit operational amplifier.

3. A receiver as claimed in claim 1, wherein said summing means is voltage sensitive to sum the amplitudes of the voltage of the signals received by said filters.

4. A multi-frequency receiver for receiving individual tones of multi-frequency signals, wherein each of said tones comprises one or more signals in either a high or a low frequency group within the voice frequency range, the invention comprising: a plurality of combined filtering and amplifying stages for passing only a selected signal the each group within said range, a plurality of frequency selective stages with a separate filter for each frequency selected, means commonly connected to the filters of each group and responsive to a frequency signal transmitted through a filter of each group for producing a voltage output derived from said signal; wherein the means for producing a voltage includes means for checking said selected signals individually against predetermined minimum standards for amplitude, means for summing the voltage of both said signals, means for checking the duration of continuing occurrence for a predetermined period of both said signals, means responsive to th summed signal exceeding a predetermied reference amplitude for passing a validity control signal, and means operative after the termination of both said selected signals from said filters and the receipt of the validity control signal for passing an acceptance signal for transmission to an output circuit of said selected signals.

5. A receiver as claimed in claim 4, wherein said summing means comprises a voltage sensitive operational amplifier.

6. A receiver as claimed in claim 5, wherein there are means individual to each frequency selective filter for temporarily storing signals passed by the filters, and means responsive to the end of said duration and before termination of input signals for preventing temporary storage of additional signals.

* * * * *

UNITED STATES PATENT OFFICE

CERTIFICATE OF CORRECTION

Patent No. 3,845,249 Dated October 29, 1974

Inventor(s) Daniele Sellari, Jr.

It is certified that error appears in the above-identified patent and that said Letters Patent are hereby corrected as shown below:

On the Cover Sheet, in item [75] "Henry A. Richard" should read -- Henry A. Richardson --.

Signed and sealed this 6th day of May 1975.

(SEAL)
Attest:

RUTH C. MASON
Attesting Officer

C. MARSHALL DANN
Commissioner of Patents and Trademarks